United States Patent [19]

Nachtigall, Jr.

[11] 4,036,401
[45] July 19, 1977

[54] HOT SHELF ASSEMBLY

[75] Inventor: Walter E. Nachtigall, Jr., Minnetonka, Minn.

[73] Assignee: Palm Brothers, Incorporated, Minneapolis, Minn.

[21] Appl. No.: 613,259

[22] Filed: Sept. 15, 1975

[51] Int. Cl.² ............ A47F 1/00; B65G 60/00; H05B 1/00
[52] U.S. Cl. ............ 221/150 A; 221/285; 108/8; 211/49 D; 211/133; 219/214; 248/291
[58] Field of Search .......... 211/49 R, 49 D, 133; 221/285, 150 A; 219/214, 218, 455; 248/291; 108/8

[56] References Cited

U.S. PATENT DOCUMENTS

| 1,282,489 | 10/1918 | Strodel | 248/291 X |
|---|---|---|---|
| 1,705,237 | 3/1929 | Bulman | 108/8 |
| 1,745,784 | 2/1930 | Davis | 211/49 D |
| 2,018,024 | 10/1935 | Kress | 219/218 X |
| 2,046,973 | 7/1936 | Schroeder | 99/425 |
| 2,050,638 | 8/1936 | Tuthill | 211/133 X |
| 2,519,163 | 8/1950 | Turner | 248/291 |
| 2,775,497 | 12/1956 | Alvarez | 108/8 X |
| 2,945,938 | 7/1960 | Alvord | 219/214 |
| 3,019,907 | 2/1962 | Belejack | 211/49 D |
| 3,151,576 | 10/1964 | Patterson | 211/133 UX |
| 3,454,318 | 7/1969 | Kemp et al. | 219/214 X |
| 3,632,968 | 1/1972 | Wilson | 219/214 |

FOREIGN PATENT DOCUMENTS 1,469,142  1/1967  France .................. 211/133

Primary Examiner—Robert B. Reeves
Assistant Examiner—Frederick R. Handren
Attorney, Agent, or Firm—Burd, Braddock & Bartz

[57] ABSTRACT

A tiltable dispensing or serving plate or shelf capable of controlling the temperature of the items to be dispensed, such as by cooking or keeping food items warm or cold, particularly such as are served in fast food restaurants, such as hamburgers, hot dogs, cold drinks, and the like. The plate is tiltable and has a multiplicity of chutes or slides for maintaining the items to be dispensed in separate rows, with the ones to be dispensed located at the bottom of each of the chutes while the items added last to the row are located at the top of each chute. The temperature is variable and can be set at whatever temperature is necessary to accomplish the particular result desired, such as merely warming, cooling or actually cooking.

14 Claims, 11 Drawing Figures

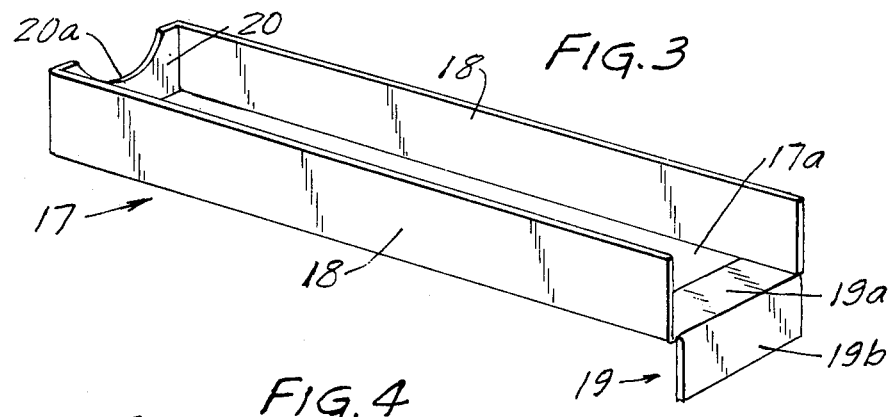
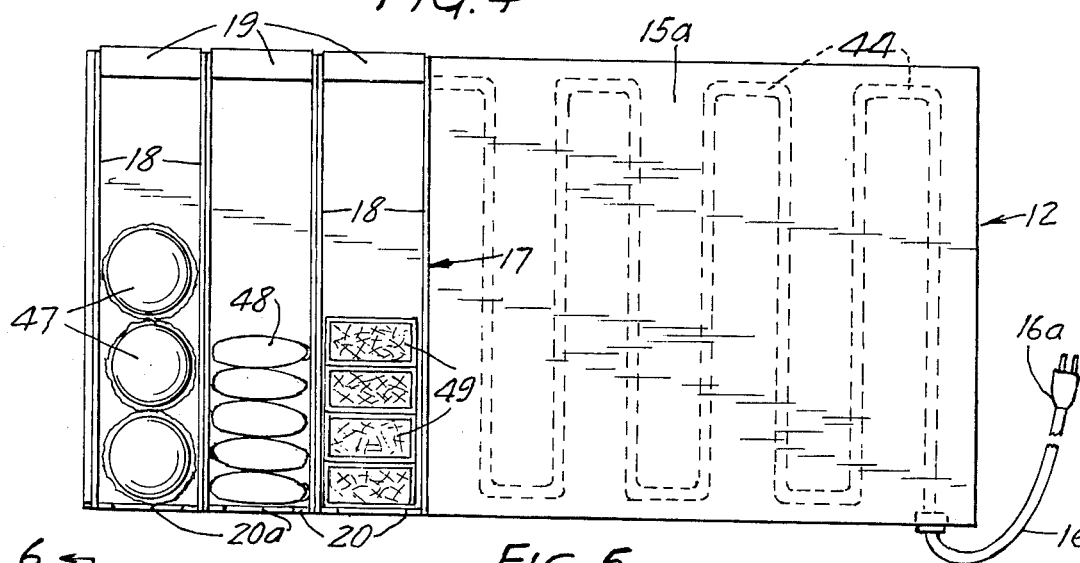
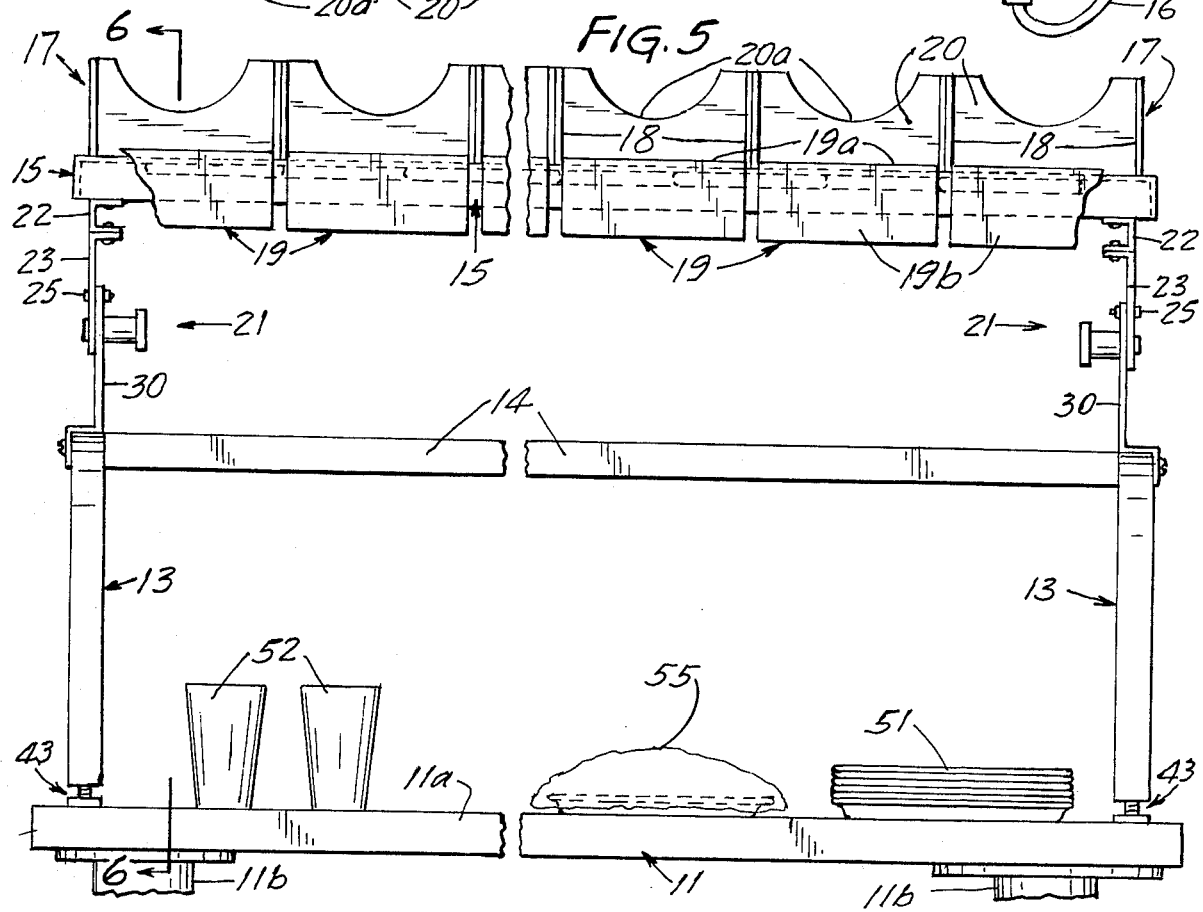

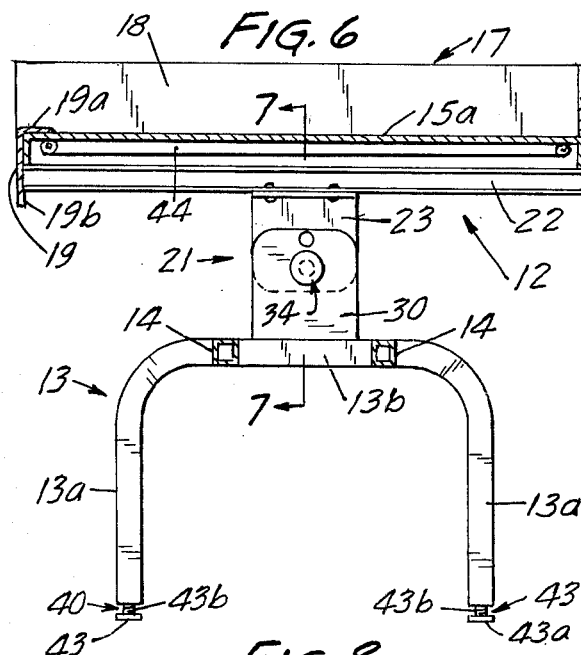

HOT SHELF ASSEMBLY

In the fast food restaurants which have developed in the last few years, the object is to serve a large quantity of food as quickly as possible, with the customers commonly lining up in rows and putting their order in at one end of the ordering line and picking it up at the other end, with a large portion of this type of business being of the carryout variety. Even if the food is eaten on premise, there are no waitresses to serve the order, and the customer must get his order all at one time, and usually at the same location. To make the customer's wait as short as possible, it is desirable to have as much of the order as possible, particularly the most popular items on the menu, available as soon as the order is placed. This is especially true during the peak hours when large numbers of people are waiting simultaneously for their orders.

Expediting filling of the orders in part involves preparation of the food, which either must be already prepared when the order is placed, or must be quickly prepared thereafter, and in part involves getting all the items necessary from a storage, cooking, or preparation area to the serving area, which is usually a counter where certain persons do nothing but take and fill orders, while other persons in another area prepare or acquire the items and make them available to the counter sales personnel. In addition to filling the orders as promptly as possible, it is desirable that the items be properly cooked (if cooking is involved) and at a particular temperature, so that the customer will be satisfied with the quality of the food itself, in addition to being satisfied with the fast service he receives.

Another problem in the fast food business is not only the large quantity which must be rapidly served, but also the fact that the business is not steady, and can be very sporadic in terms of business, with perhaps many customers being there one minute and none the next and then a few minutes later another large number coming in, and the restaurant must still be able to provide good food rapidly under these trying circumstances.

As a result of the development of this type of service, many conventional cooking and serving techniques and aids are unsuitable for the fast food business and it has been necessary to develop new means of keeping relatively large quantities of food available to the sales person working the counter and at the same time assuring for the customer a properly cooked food item at the proper temperature when he buys it.

In an effort to solve the aforementioned problems and to improve the service in fast food restaurants, the device of this invention has been designed. One object of the invention is to provide a dispensing plate or shelf with variable temperature ranges upon which almost any type of food product that needs to be at a particular temperature at the time it is served can be placed and will have its temperature maintained or controlled at the desirable temperature until or when it is dispensed.

Another object is to provide a device which will make available relatively large numbers of food items simultaneously and in such an arrangement that the available food items are accessable to a plurality of sales persons at the same time.

Still another object is to provide a dispensing device as forementioned which is designed to be fed from one side, such as the kitchen side (or whatever the initial source of the raw or partially cooked or pre-prepared food product is), with the opposite side available to sales personel who are dispensing the products and filling the orders, so that the items can be quickly moved from the preparation area to the serving or sales area, without requiring that the items be manually carried from one area to another.

Still another object is to provide a tiltable temperature controlled dispensing device which if not used to dispense a multiplicity of items can be used in normal horizontal condition as a cooking, warming, or cooling surface in a more conventional manner.

Another object is to provide a dispensing device which can be used to cook or warm a plurality of food items simultaneously, and yet can be readily dismantled and satisfactorily cleaned with a minimum of time and effort in order to meet the rigid health and sanitation standards normally required by most local governments.

These and other objects will be apparent from the accompaying drawings and the description in which:

FIG. 3 is a perspective view of one of the individual partitioning units on a slightly enlarged scale;

FIG. 4 is a top plan view;

FIG. 5 is a rear view of the device of FIG. 1 when in lowered, horizontal position;

FIG. 6 is a cross-sectional view taken along the lines 6—6 of FIG. 5;

FIG. 7 is a sectional view on an enlarged scale of the angle adjusting mechanism taken along the lines 7—7 of FIG. 6;

FIG. 8 is a plan view of one form of locking plate used in the angle adjusting mechanism of FIG. 7;

FIG. 9 is an alternative form of angle adjusting mechanism and;

FIG. 10 is a plan view of the locking plate of the form of the invention shown in FIG. 9, as seen along the approximate line 10—10 of FIG. 9.

FIG. 11 is a sectional view on an enlarged scale taken along the lines 11—11 of FIG. 7.

Figure 1:
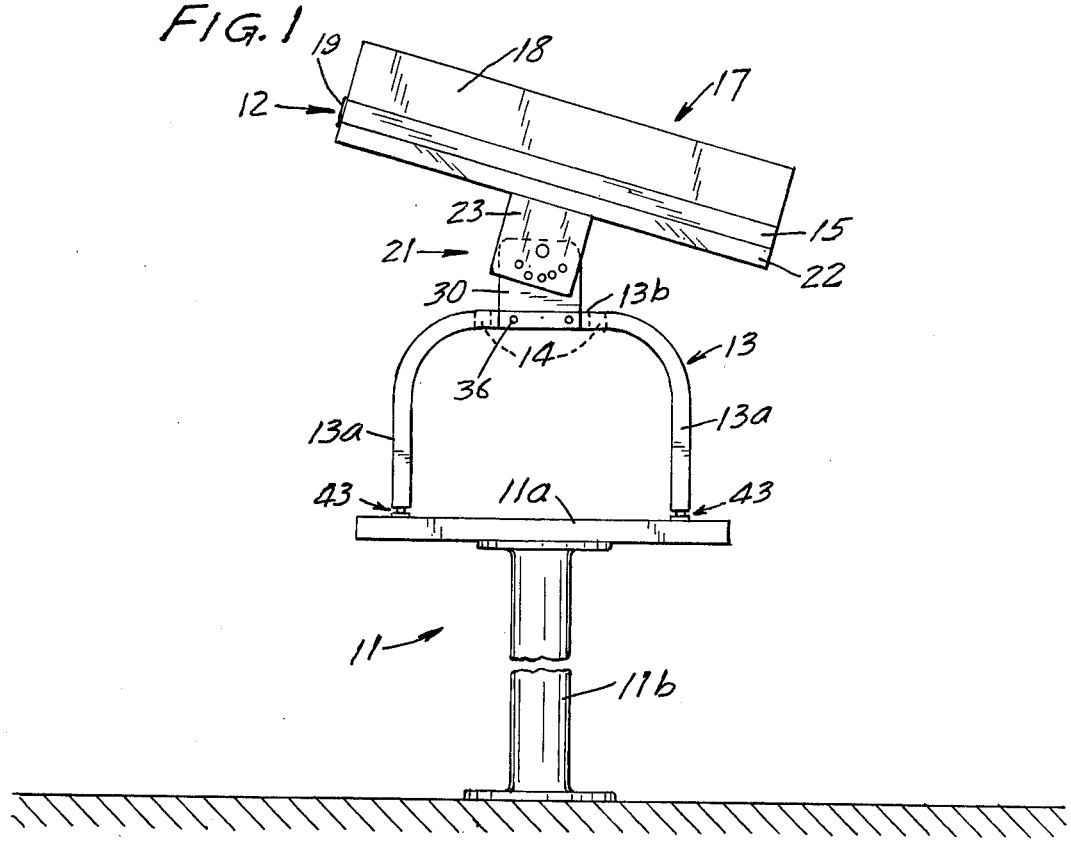
FIG. 1 is a side elevational view of one preferred embodiment of this invention.
Figure 2:
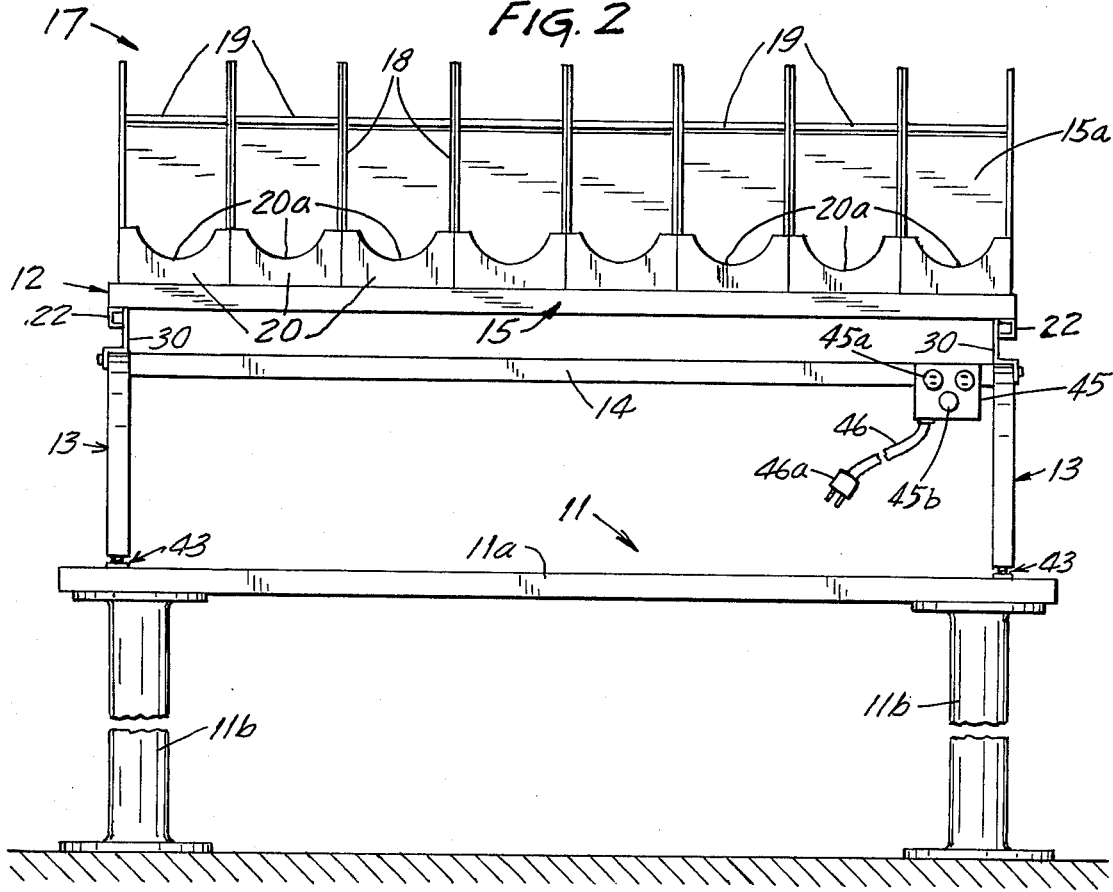
FIG. 2 is a front elevational view of the invention as shown in FIG. 1.

Referring to the drawings for a more detailed explanation and better understanding of this invention, the form of the invention illustrated in FIG. 1 includes a conventional counter or table 11 having a flat top 11a and supporting leg structure 11b, on which table structure is mounted the dispensing device of this invention, indicated generally by the numeral 12. The dispensing device includes an inverted U shaped leg unit 13 at each end which rests upon the top 11a of the counter or table 11, each unit 13 including a pair of vertical legs 13a and a horizontal bar 13b connecting each pair of legs, the "U" shaped leg units being rigidly interconnected by a pair of elongate connecting members 14. Each of the legs of the leg structure 13 is provided with an adjustable leg supporting member 43 having a horizontal supporting disc 43a and a vertical threaded shank 43b which is threadedly engaged with the lower end of each leg 13a. Thus, by turning each adjusting member 43 one way or the other, each leg 13 can be selectively lengthened or shortened. Thus, by adjusting members 43, the overall height of the device can be selectively raised or lowered, and the legs can be individually adjusted to assure that the device is properly balanced on its supporting surface, such as the table 11.

A base 15 is provided for the dispensing device which in FIG. 1 is tilted with the higher side representing the kitchen or loading side and the lower end representing the sales or dispensing side.

The dispensing device of this invention may or may not involve a temperature control system for heating or cooling the objects being dispensed. However, the illustrated version involves a heating system so that the items being dispensed can be heated so that they can either be warmed up, maintained at an above room temperature at which they were placed on the device, or can actually be cooked while on the device. However, it will be understood that devices with no temperature controls at all, or with controls capable of cooking the items, or controls capable of selectively cooling or heating, or devices wherein part may be cooled, part may be heated, and part with no temperature control, or any combination of the foregoing are all within the scope of this invention. The base is provided with heating coils 44 seen in dotted outline in FIG. 4 which are connected to a source of energy such as electric cord 16 which has a plug 16a which may be connected with a source of current in any well-known conventional manner such as inserting the plug 16a in an electrical outlet 45a of an outlet box 45 mounted on one of the supporting cross bars 14, said outlet box having a rheostat operated by dial 45b for varying the temperature. The box 45 is connected with a source of current by means of an electric cord 46 having a plug 46a for connection to another outlet (not shown). It will be understood that the outlet box 45 may be mounted in some other location, including mounting on a wall of the building itself. The heating coils may operate on a 115 volt system, and in one preferred embodiment, the temperature range is 90° F to 180° F, with a temperature of 140° F being a typical normal hold or standard temperature for fast food products such as hamburgers and the like. It is also contemplated that other sources of heat such as gas, hot water, or steam, for example, may be utilized within the scope of this invention.

The top surface 15a of the base is generally upwardly facing, and where heating or cooling is involved, is formed of highly conductive material capable of conducting heat or cold, as the case may be, to the items to be dispensed above it. It is also with in the contemplation of this invention to provide a dispensing device in which the heating or cooling may be provided from the sides and from above. As an example, the items to be dispensed might pass through a completely enclosed area having heating or cooling coils or other means built in to the side and top walls of the enclosure.

Removably mounted on top of the base 15 are a plurality of chutes or slides 17 which may be individually mounted and dismounted as desired. However, it is within the scope of this invention to have one or more of the chutes 17 interconnected in any convenient manner so that a plurality of them can be expeditiously mounted on or removed from the base 15 simultaneously. The chutes or slides serve to guide the items to be dispensed along a predetermined path of travel over the base to the location from whence they are to be dispensed. It will be noted that each of these chutes 17 in the illustrated version is provided with a pair of opposing, spaced-apart side walls 18. At one end, which will normally be the upper or loading end when the base 15 is tilted, the side walls are interconnected by an angle member 19, one leg 19a of which is physically connected to said side walls and maintains them in fixed spaced-apart relationship. The angle member also includes a depending portion or flange 19b which is adapted to engage the base 15, and serve as a stop to hold the chutes in proper position. It will be noted that the loading end of the chute (or the upper of kitchen end), is open to permit items to be readily installed in the chute. The other end of the chute 15 is provided with an upstanding wall 20 which extends between and connects the other end of the side walls 18 and maintains them in the desired spaced apart relationship.

The end wall 20 has a cut-out portion 20a to provide for more convenient access to the chute interior when removing items therefrom. It will be noted that except for angle portion 19a at the upper end, that the chute is bottomless, the wall structure defining an open area 17a with the top 15a of the hot plate or base 15 serving as the bottom of the chute when the chute is mounted thereon so that any items installed in the chute are in direct contact with the surface 15a so that they can be cooked, warmed or cooled thereby. It is within the scope of this invention to cover some or all of the chute to provide a more efficient cooling or heating area, since a top or cover would confine the hot or cold air around the item for a longer period of time, and would also provide more hot or cold air to a greater surface area of the item by being so confined, thereby also providing for more uniformity of cooling or heating of the item through exposure of a greater surface area to more heat or cold for a greater length of time.

It will also be understood that the chutes may be of different widths for whatever reason desired, such for example, as to accomodate items of different size which cannot be effectively handled and controlled in chutes of the same size. The side walls may also be of varying heights, if desired, to accomodate items of different heights. It will be apparent from the design and arrangement that a dispensing device of almost unlimited size can be built within the scope of this invention and having as many chutes as are desirable. In the illustrated version, a relatively long base 15 is provided, with no less than eight chutes mounted thereon. A plurality of items, such as hamburgers 47 or hot dogs 48 can be put in each of the chutes and when the chutes are mounted on the base, the base will normally be tilted so that the end wall 20 serves as a stop. The items such as hamburgers are initially fed to the chute from the upper or open end thereof and as previously indicated, depending on the nature of the food product and the particular needs of the restaurant, the food items can actually be cooked in the course of its stay on the hot plate and within the confines of its particular chute or, if already cooked, may be warmed and maintained at a desirable eating temperature. The same items such as hamburgers may be put in all of the chutes, or different kinds of items may be put in each of the individual chutes, such as is illustrated in FIG. 4 where hamburgers are shown in the first chute and hot dogs are shown in the second chute.

In order to accomplish the tilting of the entire unit, a hinge or adjustable link or connecting assembly 21 is provided at each end of the device and serves to support and connect each end of the tilting table top 15 with the supporting leg structure 13.

One preferred form of a hinged connecting assembly is illustrated in FIG. 7, it being understood that in the form of the invention illustrated in FIG. 1–8 inclusive, a hinged connecting assembly is provided at each end, and thay they are identical in all respects (unless otherwise indicated) and that only one description thereof will be provided which is to apply to both unless otherwise indicated. Referring particularly to FIG. 7, each connecting assembly 21 includes an upper channel member 22 which is rigidly secured as by welding to base 15 and extends transversely of the length of the table top or base 15. The upper channel 22 is rigidly connected to a mounting plate 23 having an upper flange portion 23a which is secured to the upper channel 22 by any conventional means, such as rivets 24. The mounting plate 23, which is shown in plan view in FIG. 8, has a plurality of openings formed therein, including an upper central opening 25 and also has a series of locking openings 26–29 inclusive which are formed along the arc of a circle having its center at opening 25 so that each of the openings 26–29 inclusive is actually equi-distant from opening 25. The openings 26–29 inclusive may be spaced at any increments desired, the openings being used to hold the table or base at different angles. One desired combination of spacings is to have opening 26 at the center or normal horizontal position with opening 27 being spaced 15° therefrom so as to maintain the table top or base at a 15° angle or tilt, with opening 28 being for a 30° tilt and opening 29 for a 45° tilt.

The tilt in one direction provided by the aforementioned openings is designed to move the items to be dispensed by gravity from one end of the chute to the other, with the angle of tilt affecting the speed with which the item travels from one end of the chute to the other, and how long it is in contact with the entire top plate surface underlying the chute, or certain portions thereof. It is understood that any number of such openings may be provided and at angles different from those mentioned, within the scope of this invention.

However, there may be situations where it may be desirable to tilt the top in the reverse direction, such as to empty the contents of all the chutes simultaneously. In such case, an opening such as 50 on the opposite side can be provided to accomplish this reverse tilt. In addition, some means (not shown) would have to be provided to prevent the chutes from sliding off the base, since the illustrated attachment stop means, namely the flange 19b, prevents movement in one direction only.

It is also understood that other stop means may be provided which will individually serve to prevent movement of the chute in either longitudinal directions, or laterally, if desired.

The chutes may be formed of any suitable material, such as stainless steel.

The connecting system also includes a lower rigid locking plate 30 pivotally connected to the swingable upper mounting plate 23 by means of a hinge pin or bolt 31 extending through an opening in the upper end of lower plate 30 and extending through the opening 25 in plate 23. The plate 30 has a cylinder 32 secured thereto by fasteners such as bolts 33, said cylinder 32 serving to support a locking pin 34 having a head 34a for pushing or pulling said pin. The pin 34 is spring loaded by means of a helically coiled spring 35 which is mounted inside the cylinder 32 and coiled about the pin 34 with one end of the spring bearing against the end wall of the cylinder 32, while the other end bears against a retaining element 34b carried by the pin 34, so as to continuously bias the pin towards the locking position, and into engagement with the plate 23 by inserting in one of the openings 26–29 inclusive formed therein. The pin has a tapered outer end which is designed to move into and out of any one of the openings 26–29 inclusive so as to selectively engage the plate 23 and hole the base 15 in the desired angle of tilt. Thus, if it is desired to change the angle, the operator manually grasps the head 34a and pulls the locking pin 34 out of engagement with the plate 23 and then tilts the table to the new angle desired and when the proper opening 26–29 inclusive representing the desired position moves into alignment with the pin 34, the operator simply releases said pin and permits the spring 35 to push the pin into the desired opening to thereby lock the assembly in the new position.

The lower end of the plate 30 is provided with a double offset or angle portion which consists of a horizontal leg 30a and a vertical leg 30b, which angle portion is mounted on and secured to the horizontal portion 13b of the leg structure 13 by fastening means such as screws 36. Thus, the lower plate 30 is maintained in a rigid condition and the upper plate 23 with the hot plate and chutes attached thereto is hingedly connected therewith for movement relative thereto about the pivot axis provided by the hinge pin 31.

The alternate form of hinged connecting assembly illustrated in FIGS. 9 and 10 utilizes an upper mounting plate 37 having an upper opening 38 and an arcuate slot 39 formed in the lower part thereof, which operatively cooperates with a fixed lower plate 40, which is also rigidly secured to the leg structure in the same manner as plate 30. A threaded locking pin, bolt, or member 41 extends laterally through the upper plate 37 and extends through the slot 39 and is provided with a wing nut 42, the wing nut being threadedly engaged with the threaded shank portion 41a, the head portion 41b frictionally engaging the outer face of the upper place 37 and being held thereagainst by the tightening, pulling action of the wing nut 42. This provides for more adjustments or an infinity of adjustments between the ends of the slot 39 so that all the operator need do to change the angle of the table is to loosen the wing nut 42 and make the desired adjustment in the angle of the table and then retighten the wing nut to hold the upper and lower plates in fixed relationship. It will be noted that in this form the base 15 can be tilted in either direction within a relatively wide range of angular positions.

FIG. 11 illustrates another alternate form, in which the mounting bracket or plate 23, and more particularly the lateral flange 23a thereof, is provided with intersecting elongate slots 53 and 54 which are disposed at right angles to one another, and are adapted to receive a fastener 24, such as bolt 55 with its nut 55a, or any other suitable fastener. These slots enable the base or table top 15 to be longitudinally and laterally adjustable to fit all types of installations and supports, a washer 56 being interposed between 23 and nut 55a.

The elevated nature of this dispensing device when mounted on a counter or table top such as 11 places the items to be dispensed at a convenient and comfortable height where items can be removed without bending over. In addition, other items, such as trays 51 and drinks 52 and other items including the so called "slow" foods, can be stored on the counter directly beneath the items in the tilted dispenser, so that as many items as possible are collected in a small convenient area for filling orders.

It will thus be appreciated that the dispensing table (which is also sometimes referred to as a shelf, slab, or plate) can be tilted to any convenient angle which will best meet the needs of restaurants, it will depend on the type of food being served, and the length of time it is desired to maintain the food in contact with the dispensing plate. The multiplicity of bins provided by the many chutes on the table enables a number of people to work a serving counter and to have immediate access simultaneously to a plurality of items in the properly cooked condition and the desired eating temperature. It will be further appreciated that because of the straight sides of the chutes and the fact that there are no corners whatsoever except at the junction of the side walls with the angle 19, that the chutes are very easy to clean thoroughly since there are virtually no corners where food can collect. If the owners do not desire to use the entire table top surface for dispensing food items, only that number of chutes need to be installed which will serve the particular needs. Also, if ordinary cooking is desired, the chutes can be removed and the table top can be used in a flat, horizontal position such as in FIG. 6 where it can be used as a conventional cooking surface. If for some reason it is desirable to partition off a part of the cooking surface while it is horizontal and to locate some items in a confined area therein, a few of the chutes may be mounted thereon such as is illustrated in FIG. 4.

The surface 15 can be maintained at a freezing temperature which will enable items to either be cooled or actually frozen after they have been placed on the tray, or to keep them in a frozen condition if they were frozen at the time they were placed in the chutes (such as ice cream bars, for example). Also, items such as French fries 49 can be installed in the chutes for ultimate dispensing and covered trays which might contain silverware or anything else.

It will, of course be understood that various modifications, variations and changes may be made in the form, details, arrangements and proportion of the parts as set forth herein without departing from the spirit and scope of the invention, the specific embodiments described herein being given by way of example only for clearness of understanding, and no unnecessary limitations should be understood therefrom, and the appended claims should be construed as broadly as permissible in view of the prior art.

The embodiments of the invention in which an exclusive property or privilege is claimed are defined as follows:

1. A dispensing device comprising: a base having a generally therebetween, facing object supporting surface, a support for positioning the base at an elevation, means movably mounting said base on the support, said base being tiltable from a horizontal position to at least one inclined position, said mounting means including first connecting means secured to the base and second connecting means secured to the support, pivot means pivotally connecting the first connecting means with the second connecting means and lock means for holding the first and second connecting means in at least one selected relative position, means for holding at least one object on the top of said base when in said inclined position, said holding means including one chute, said chute including spaced apart side walls for confining said object therebetweem, there being no object supporting surface forming a part of said chute throughout the majority of the length of said side walls, stop means at one end of said chute for preventing said object from escaping from said chute under the influence of gravity, and means carried by said chute and adapted to engage said base to maintain said chute in the desired operative position on said base, and means mounted in said base for varying the temperature thereof.

2. The device of claim 1 wherein: the lock means includes first detent means for releasably holding the base in selected inclined positions.

3. The device of claim 1 wherein: said locking means comprises an elongate element selectively insertable in an opening of said first connecting means and, spring means continuously biasing said element towards locking engagement with said opening.

4. The device of claim 1 including: an arcuate slot in one of said connecting means, a first locking element supported by the other of said connecting means and adapted to travel in said slot, and a second locking element engageable with said first locking element and the connecting means in which said slot is formed for releasably holding said first and second connecting means against relative movement to hold said base in the desired angular position.

5. The device of claim 1 wherein: said base has a corner portion defining part of the perimeter of said base, and said means carried by said chute comprises a depending flange portion which depends from and extends below the lowest edge of the side walls of said chute, said flange portion being adapted to frictionally engage a portion of said corner portion of said base and removably maintain said chute on said base.

6. A chute for holding objects on and guiding their path of travel over an inclined supporting surface, said chute comprising a pair of upstanding side walls for confining an object therebetween and defining said path of travel, there being no object supporting surface forming a part of said chute throughout the majority of the length of said side walls, one end of said chute having an upstanding end wall preventing discharging of an object from said chute under the influence of gravity, the other end of said chute being open to facilitate insertion of objects into said chute between said side walls, said chute having a flange member extending from said side walls and below the lowermost marginal edge portions thereof and depending from the open end of said chute, said depending member being adapted to engage the structure defining said supporting surface to prevent movement of said chute relative to said supporting surface when it is inclined downwardly in the direction toward said end wall.

7. The chute of claim 6 wherein: said end wall has a cut-out portion forming a part of the upper edge thereof to facilitate reaching into said chute to remove an object therefrom, the lowermost portion of said upper edge being above the lowermost marginal edge portion of said side walls.

8. A dispensing device for prepared food items comprising: a base having a flat generally upwardly facing food item supporting surface formed of thermally conductive material, a support for positioning the base at an elevation, pivot means pivotally connecting the base with the support and lock means for holding the base and support in a selected relative position whereby the base is tiltable from a horizontal position to at least one inclined position, means mounted in the base for controlling the temperature thereof, and at least one generally rectangular chute for holding food items on and guiding their path of travel over said supporting surface when it is inclined, each chute including a pair of upstanding side walls for confining food items therebetween and defining their path of travel, one end of each chute having an upstanding end wall preventing discharging of food items from said chute under the influence of gravity, the other end of said chute being open to facilitate insertion of food items into the chute between said side walls, said chute having a flange member mounted with respect to the lowermost marginal edge portions of the side walls proximate the open end and depending downwardly therefrom, said flange member being adapted to engage the base to prevent movement of said chute relative to said surface when it is inclined downwardly in a direction towards the end wall, wherein the lowermost edges of the end wall and side walls together with the flange member edge nearest the end wall define an opening spanning most of the length of the side walls, and wherein the side walls, end wall and flange member define substantialy the entire structure of the chute.

9. The device of claim 8 wherein at least a portion of the upper edge of the end wall is below the upper edge of the side walls adjacent the end wall, all of said end wall upper edge being above the object supporting surface, thereby facilitating the removal of the food items from the chute while preventing its discharge from the chute due to gravity.

10. The device of claim 8 including counter means for supporting said support, the counter means having a substantially level surface for supporting food items, wherein sufficient clearance is provided between the counter means and the base such that no food item supported by one of them contacts the other.

11. The device of claim 4 wherein: the flange member includes a generally flat leg portion attached to the side walls at the lowermost marginal edge portions thereof, and a downwardly projected flange portion fixed to the leg portion, said flange portion being adapted to engage the base.

12. A dispensing device comprising: a base having a flat generally upwardly facing object supporting surface, support means for positioning the base at an elevation, and at least one generally rectangular chute for holding objects on and guiding their path of travel over said supporting surface, each chute including a pair of upstanding side walls for confining objects therebetween and defining their path of travel over the supporting surface, one end of each chute having an upstanding end wall preventing slidable discharge of objects from said chute, the other end of said chute being open to facilitate insertion of objects into the chute between said side walls, said chute having a flange member mounted with respect to the lowermost marginal edge portions of the side walls proximate to the open end and depending downwardly therefrom, said flange member being adapted to engage the base to prevent movement of said chute relative to said supporting surface in at least one direction, wherein the lowermost edges of the end wall and side walls together with the flange member edge nearest the end wall define an opening spanning most of the length of the side walls, and wherein the side walls, end wall and flange member define substantially the entire structure of the chute.

13. The dispensing device of claim 12 including: pivot means pivotally connecting the base with the support means whereby the base is tiltable from a horizontal position to at least one inclined position, and lock means for holding the base in at least one inclined position.

14. The device of claim 12 wherein: the flange member includes a generally flat leg portion attached to the side walls at the lowermost marginal edge portions thereof, and a downwardly projected flange portion fixed to the leg portion, said flange portion being adapted to engage the base.

* * * * *

UNITED STATES PATENT AND TRADEMARK OFFICE
CERTIFICATE OF CORRECTION

PATENT NO. : 4,036,401
DATED : July 19, 1977
INVENTOR(S) : Walter E. Nachtigall, Jr.

It is certified that error appears in the above-identified patent and that said Letters Patent are hereby corrected as shown below:

Column 7, line 48, cancel "therebetween," and insert -- upwardly --

Signed and Sealed this

Twenty-fifth Day of October 1977

[SEAL]

Attest:

RUTH C. MASON
Attesting Officer

LUTRELLE F. PARKER
Acting Commissioner of Patents and Trademarks